(12) United States Patent
Snow et al.

(10) Patent No.: US 8,903,921 B1
(45) Date of Patent: Dec. 2, 2014

(54) METHODS, SYSTEMS, AND ARTICLES OF MANUFACTURE FOR ANALYZING BEHAVIOR OF INTERNET FORUM PARTICIPANTS

(75) Inventors: David J. Snow, San Diego, CA (US); Bennett R. Blank, San Diego, CA (US); Michelle D. McAlister, San Diego, CA (US)

(73) Assignee: Intuit Inc., Mountain View, CA (US)

( * ) Notice: Subject to any disclaimer, the term of this patent is extended or adjusted under 35 U.S.C. 154(b) by 627 days.

(21) Appl. No.: 12/771,818

(22) Filed: Apr. 30, 2010

(51) Int. Cl.
*G06F 15/16* (2006.01)

(52) U.S. Cl.
USPC .......................................... 709/206; 709/204

(58) Field of Classification Search
USPC ................................................. 709/204–207
See application file for complete search history.

(56) References Cited

U.S. PATENT DOCUMENTS

| | | | |
|---|---|---|---|
| 2004/0111353 A1* | 6/2004 | Ellis et al. ........................ 705/36 |
| 2004/0111479 A1* | 6/2004 | Borden et al. ................ 709/206 |
| 2005/0114449 A1* | 5/2005 | Verhaeghe et al. ........... 709/204 |
| 2007/0067405 A1* | 3/2007 | Eliovson ........................ 709/206 |
| 2008/0034049 A1* | 2/2008 | Stokes .......................... 709/206 |
| 2008/0071901 A1* | 3/2008 | Adelman et al. .............. 709/223 |
| 2008/0178081 A1* | 7/2008 | Reshef et al. ................. 715/700 |
| 2008/0244438 A1* | 10/2008 | Peters et al. .................. 715/772 |
| 2009/0198565 A1* | 8/2009 | Pluschkell et al. ............. 705/10 |
| 2010/0306179 A1* | 12/2010 | Lim .............................. 707/688 |
| 2011/0125844 A1* | 5/2011 | Collier et al. ................. 709/204 |
| 2013/0203485 A1* | 8/2013 | Walker et al. .................. 463/25 |

* cited by examiner

*Primary Examiner* — Yasin Barqadle
(74) *Attorney, Agent, or Firm* — Vista IP Law Group LLP

(57) ABSTRACT

Methods, systems, and articles of manufacture for analyzing behavior of Internet forum participants. Various embodiments comprise receiving or retrieving information or data of a particular post of interest and other information or data relating to the first post or the Internet forum; analyzing the data or information received or retrieved to determine the behavior of the user who initiated or created the post; determining whether the particular post is of interest; and determining user behavior patterns. Some embodiments may also comprise determining or identifying one or more actions for the behavior of the user or determining or predicting likely effects of the particular post on the Internet forum. In some embodiments, the method or the system presents a report or recommendation to a moderation team for review, approval, or decision.

27 Claims, 13 Drawing Sheets

708 ACTION
1102 WARNING VIA PRIVATE / PUBLIC MSG;
1104 EXILE / BAN: TEMPORARY / PERMANENT BAN ON ACCOUNT, IP, IP RANGE, ETC.;
1106 REMOVAL OF CONTENTS / POSTS / THREADS;
1108 TOPIC LOCK;
1110 THREAD LOCK;
1112 WORD CENSOR;
1114 ADJUST STATUS, COUNTS, ETC.;
1116 AWARD;
1118 DISCOUNT FOR FUTURE PRODUCTS / SERVICES;
1120 AUTO GENERATION OF POST(S) WITH NEEDED INFO;
.
.
.
.

FIG. 11

1200 CRITERIA
1202 NO. OF THREADS STARTED;
1204 NO. OF POSTS;
1206 LENGTH OF DISCUSSION;
1208 NO. OF USERS PARTICIPATING IN DISCUSSION;
1210 RATIO OF REGULAR USERS TO NEW USERS;
1212 MOST FREQUENTLY SEARCHED TERM(S);
1214 TIME OF DAY DISCUSSIONS ARE BEING POSTED;
1216 AMOUNT OF TEXT CONTENT IN EACH POST;
1218 LENGTH OF CHAINS OF QUOTES;
1220 WHICH USER(S) IS (ARE) INVOLVED IN DISCUSSIONS;
1222 HOW OFTEN A USER QUOTES OTHERS? BY WHICH USERS?
1224 HOW OFTEN A USER GETS QUOTED BY OTHERS?
1226 HOW MANY TIMES A USER IS QUOTED IN A PARTICULAR THREAD / DISCUSSION?
1228 HOW MANY TIMES THE "QUOTE" BUTTON ARE USED IN A POST?
1230 HOW OFTEN A USER CHECKS OTHER USERS' PROFILES?
1232 HOW OFTEN A USER'S PROFILE IS CHECKED BY OTHER USERS?
1234 HOW OFTEN DOES A USER LEAVE COMMENT(S) ON OTHER USER'S PROFILE(S)? ON WHICH USER(S)?
1236 HAS A USER SENT / RECEIVED PRIVATE / PERSONAL MESSAGES TO / FROM OTHER USER(S)?
1238 HAS A USER IGNORED OTHER USER(S)? HOW FREQUENT?
1240 HAS A USER BEEN IGNORED BY OTHER USERS? HOW FREQUENT?
.
.
.

508 DETERMINE WHETHER $1^{ST}$ POST IS OF INTEREST

FIG. 12

METHODS, SYSTEMS, AND ARTICLES OF MANUFACTURE FOR ANALYZING BEHAVIOR OF INTERNET FORUM PARTICIPANTS

BACKGROUND

The invention relates to Internet forums, message boards and on-line communities. An Internet forum, message board, or online community (hereinafter Internet forum) is an online discussion site that constitutes software applications that manage user-generated contents. In a typical Internet forum, participants or users (hereinafter users) benefit from such user-generated contents. Such benefit is usually enhanced with larger numbers of users in a particular Internet forum because the majority (around 90%) of an Internet forum's contents are generally created by a minority (around 10%) of the users.

Most users also benefit from other users' feedback on a particular post. For example, many Internet forums provide several single-click feedback provisions in the GUI (such as "like this post", "flag this post", "notify me later", etc.) for a user to quickly provide his or her feedback on a particular post. Users may also benefit from back-and-forth interaction from other users.

On the other hand, users or especially registered users are generally allowed to have great degree of freedom to express their thoughts in an Internet forum; a handful of users may either "make" or "break" the mood of an Internet forum by, for example, diluting topics, taking topics off topic, intentionally sabotaging topics, etc. As a result, moderators of Internet forum have a difficult task of sifting through problematic or viral disruptions in the community which may potentially result in losing users in the user base. The sheer amount of information that the forum moderator must sift through, especially of an Internet forum with some substantial number of users, further exacerbates the problems because, when facing such a sheer amount of information, moderators often find it difficult to determine which information to sift through first.

In addition, there may exist influential situations which rise above a typical day-to-day noise in any given Internet forum. Such influential situations may affect the general tenor of the community for good or bad. For example, negative or disruptive posts or dialog most often falls below a threshold of the usual feedback mechanism that is put in place. That is, a post may not be sufficiently offensive to be "flagged" by other users or may not be sufficiently "hostile" to cause other users to generate and send comments to moderators. Nonetheless, such a post carries certain negative influences on other users in that it may decrease the willingness of other users to participate in the discussions or may even discourage other users from review various topics or threads in the Internet forum. The aggregation of such posts may further sway users away from the Internet forum and thus vitiate the value or benefit of the Internet by, for example, reducing the user base.

On the other hand, valuable forum contributors who spend time to create useful posts and to start helpful threads may go unnoticed by the moderators simply because of the sheer amount of information that moderators need to go through. Other users derive more benefit from such posts and threads as the number of these posts and threads increase. These useful posts and helpful threads may thus create even more goodwill and attract more users to the Internet forum. Properly rewarding such contributors for their valuable posts and threads may further encourage these contributors to become even more productive or better motivated.

SUMMARY

Disclosed are various embodiments of methods, systems, and articles of manufactures for predict user behavior patterns in an Internet forum.

In one or more embodiments, a method or system for determining user behavior patterns comprises a process or module of receiving or retrieving information or data of a particular post of interest and other information or data relating to the first post or the Internet forum and a process or module of analyzing the data or information received or retrieved to determine the behavior of the user who initiated or created the post. In the single embodiment or in some embodiments, the method or system for determining user behavior patterns may further comprise determining whether the particular post is of interest.

In the single embodiment or in some embodiments, the method or system for analyzing behavior of Internet forum participants may further comprise determining or identifying one or more actions for the behavior of the user. Some embodiments of the methods or the systems as disclosed herein are implemented by automatically using or invoking various processes on or modules of a computer system with one or more processors such that the moderation team of the Internet forum need not manually review a plurality of posts or threads of the Internet forum to prevent influential posts to negatively affect various goals of the Internet forum. Various embodiments do not, however, preclude the possibility of human intervention, and some embodiments may further optionally request intervention by the moderation team for verification or confirmation purposes. In some embodiments, the method or the system for analyzing behavior of Internet forum participants generates a report and sends the report to the moderation team, which comprises one or more human moderators, for review or approval.

Various embodiments of the methods or systems for determining user behavior patterns comprise a process or module with intelligence or learning capabilities to improve the accuracy of the determination of the user behavior patterns.

BRIEF DESCRIPTION OF THE DRAWINGS

The drawings illustrate the design and utility of various embodiments. It should be noted that the figures are not drawn to scale and that elements of similar structures or functions are represented by like reference numerals throughout the figures. In order to better appreciate how to obtain the above-recited and other advantages and objects of various embodiments, a more detailed description of the inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which:

FIG. 11 illustrates more details of an action module of a method or a system for analyzing behavior of Internet forum participants.

FIG. 12 illustrates criteria/factors that may be considered by a method or a system for analyzing behavior of Internet forum participants.

DETAILED DESCRIPTION OF ILLUSTRATED EMBODIMENTS

Various embodiments are directed to a method, system, and computer program product for analyzing behavior of Internet forum participants. Other objects, features, and advantages of the invention are described in the detailed description, figures, and claims.

Various embodiments of the methods, systems, and articles of manufacture will now be described in detail with reference to the drawings, which are provided as illustrative examples of the invention so as to enable those skilled in the art to practice the invention. Notably, the figures and the examples below are not meant to limit the scope of the present invention. Where certain elements of embodiments can be partially or fully implemented using known components (or methods or processes), portions of such known components (or methods or processes) that are necessary for an understanding of the present invention will be described, and the detailed descriptions of other portions of such known components (or methods or processes) will be omitted for ease of explanation and to not obscure embodiments of the invention. Further, embodiments encompass present and future known equivalents to the components referred to herein by way of illustration.

Figure 1:
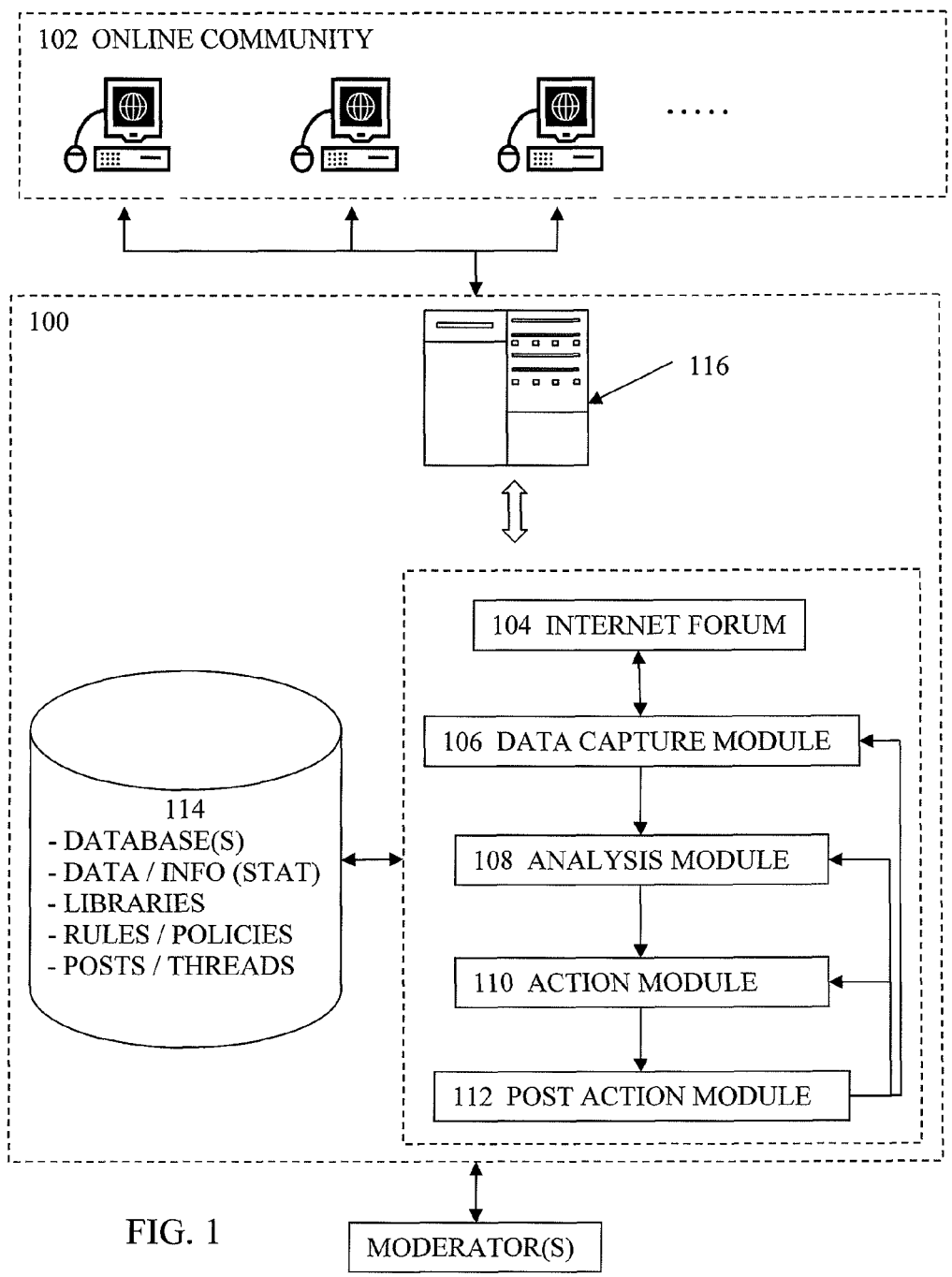
FIG. 1 illustrates a schematic configuration of a system or process for analyzing behavior of Internet forum participants.

FIG. 1 illustrates a high level architectural view of some embodiments directed to a system 100 for analyzing behavior of Internet forum participants analyzing behavior of Internet forum participants that interfaces with an online community 102. In one or more embodiments, the system 100 for analyzing behavior of Internet forum participants comprises a computing node 116 such as a computer or server that comprises or is programmed to interact with an internet forum 104 and a storage module 114 for storing data or information such as, but not limited to, database(s) for various types of data, various statistics, static and dynamic libraries of various applications, various rules and policies of the Internet forum, data or information of the posts and/or threads, etc. The storage module 114 may comprise a computer storage device, a volatile or non-volatile non-transitory computer readable storage medium, etc. More details of various forms of the storage module will be described in the System Architecture Overview section below. Communications between various computers shown in FIG. 1 are performed through respective networks. Each of the networks and other networks discussed herein (generally, network) may be different, or two or more networks may be the same depending on the system configuration and communication protocols employed. One or more or all of the networks may, for example, be a cellular network, a wireless network, a Local Area Network (LAN) and/or a Wide Area Network (WAN). Reference to a network generally is not intended to refer to a specific network or communications protocol, and embodiments can be implemented using various networks and combinations thereof.

In one or more embodiments, the computing node 116 in the system for analyzing behavior of Internet forum participants analyzing behavior of Internet forum participants further comprises or is further programmed to interact with a data capture module 106, which captures data or information from or related to the various posts and/or threads for analysis, and an analysis module 108, which analyzes the information or data to determine whether a certain post is of particular interest, and corresponding action(s) for the certain post if it determines that the post is of interest. The computing node 116 in the system for analyzing behavior of Internet forum participants further comprises or is further programmed to interact with an action module 110, which performs various actions determined by the analysis module, and optionally a post action module 112, which performs various other processes after the actions have been performed, in the single embodiment or in some embodiments. The various modules 104-112 accesses and interacts with the storage module 114 for various data input and output. More details of the data capture module 106, the analysis module 108, the action module 110, and the post action module 112 will be described in subsequent paragraphs with reference to various figures.

In some embodiments, the action process or module 110 may further optionally comprise a process or module for creating and sending a report based on the results of the data capture module 106 or the analysis module 108 to the moderation team for review or approval. In these embodiments, the moderation team comprises one or more human moderators for human intervention purposes. In one or more embodiments, the report comprises relevant information or data concerning the various posts or threads that are of interest or that may be determined to be influential. In one or more embodiments, the report comprises recommendation or recommended actions for the moderation team's review, approval, or choice. In some embodiments where the method or system for analyzing behavior of Internet forum participants is having difficulties to determine or identify an appropriate course of action due to, for example but not limited to, lack of confidence, insufficient data, unknown data, conflicting data or information, etc., the method or the system may generate and forward a report with sufficient information to the moderation team such that the moderation team may make a determination.

For example, a report may present a plurality of recommended actions together with relevant information to the moderation team so that the moderation team may decide on the final action to be taken for a particular post or thread. In these embodiments, the human intervention prevents or reduces the possibilities of actions or consequences thereof due to, for example but not limited to, ambiguities, uncertainties, or insufficient data points to make a definitive or conclusive determination in various processes or modules in various embodiments disclosed herein. For example, the data capture process or module 106 may encounter ambiguities or uncertainties during the interpretation or data capturing of a particular post; the analysis process or module 108 may also encounter substantially equally weighed situations where two recommended actions result in different consequences or other circumstances where the cost function analysis, which will be described in subsequently paragraphs, results in substantially equally weighed cost function analysis results; or there may exist insufficient statistical data for the method or system to generate a recommended action with sufficient confidence level. In this example, the method or the system may furnish a report together with sufficient information concerning the posts, threads, or various analytical results to the moderation team to decide upon a final action to take on for this particular post.

Figure 2:
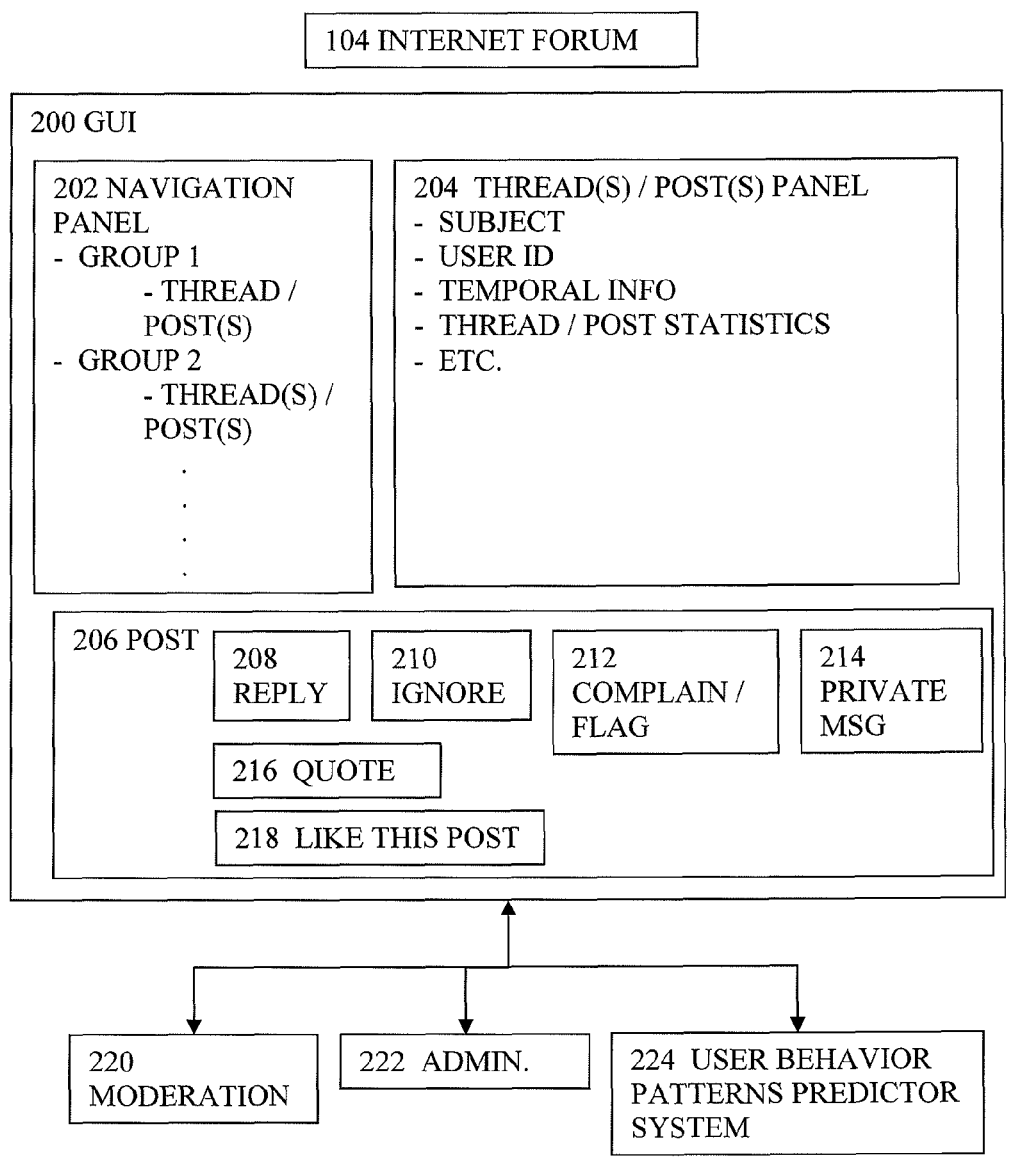
FIG. 2 illustrates a schematic implementation of an Internet forum by using the system or process for analyzing behavior of Internet forum participants.

Referring to FIG. 2, which illustrates a schematic implementation of an Internet forum 104 by using the system for analyzing behavior of Internet forum participants, the Internet forum 104 may be presented to the users or participants by using a graphical user interface (GUI) 200. The GUI may include a navigation panel 202 to allow the users to quickly navigate to a desired post, thread, and/or group within the Internet forum. The Internet forum 104 may further comprise a thread and/or post panel 204 that shows more detailed information of a group, a thread of posts, or a particular post. Such detailed information may comprise, for example but not limited to, the subject, user identifications, temporal information, or some statistics of particular thread(s), post(s), or discussion(s). It shall be noted that the terms user and participants may be used interchangeably throughout the description of various embodiments and thus should be interpreted as such.

The Internet forum 104 may further comprise quick comment tools for a particular post 206. These quick comment tools may comprise, for example but not limited to, 208 "reply to the post", 210 "ignore the post", 212 "complain about/flat the post", 214 "send private message to poster", 216 "quote this particular post", 218 "like this post", etc. The Internet forum is supported on the back end which comprises the moderation team 220 which moderates and regulates the discussions on the Internet forum, the administrator(s) 222 who resolves the technical issues of the Internet forum, and the user behavior pattern predictor system 224. More information about the user behavior pattern predictor system 224 will be described in greater detail with reference to FIGS. 3-12.

Figure 3:
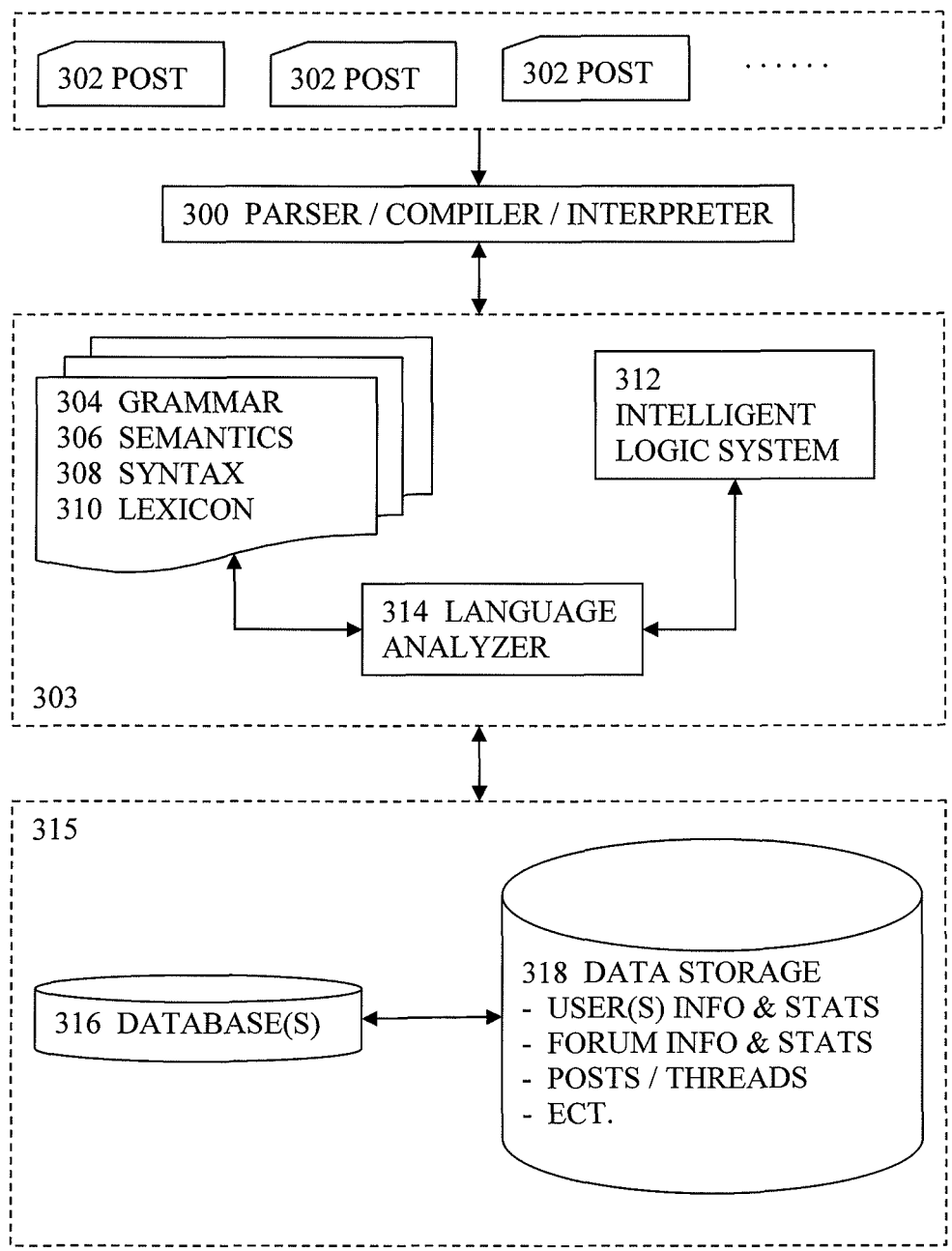
FIG. 3 illustrates a exemplary embodiment of a data capture module or process.

Referring to FIG. 3, which illustrates a exemplary embodiment of a data capture module, in one or more embodiments, the data capture module 106 comprises a parser, compiler, or interpreter (hereinafter parser) 300, which receives or identifies various posts or threads 302 that have been posted in the Internet forum. The parser 300 interacts with, reads from, or writes to a backend analyzer 303 and a storage module 315 in the single embodiment or in some embodiments.

The backend analyzer 303 comprises the grammar module 304, semantics module 306, syntax module 308, and/or lexicon module 310 in one or more embodiments. The backend analyzer 303 may further comprise the language analyzer 314 that interacts with the grammar module 304, semantics module 306, syntax module 308, and/or lexicon module 310 to analyze the contents of the posts or threads 302.

In one or more embodiments, the backend analyzer 303 may parse through the various posts or threads 302 to retrieve data or information such as the length of the threads, the user information of a particular post, the time of the post, or any other information or data related to a particular post without analyzing the language or textual contents of the particular post or thread.

The grammar module 304 may comprise grammar such as, but not limited to, dependency grammar, lexical functional grammar, categorical grammar, link grammar for natural language or human language processing, etc., to the parser 300 for the parser 300 to parse through and to help understand the contents of a particular post or thread 302.

The semantics module 306 provides semantic information or meanings of vocabularies or expressions to help the parser 300 to describe the contents of the posts or threads 302 in a meaningful manner in the single embodiment or in some embodiments. The semantic module 306 may comprise the generative or interpretative semantics to help explain, for example but not limited to, synonymity or transformation of the vocabularies or expressions of the posts or threads 302 in some embodiments.

The syntax module 308 provides the parser 300 with one or more principles, rules, or syntaxes to help the parser 300 to describe the contents of a particular post or thread 302 in the single embodiment or in some embodiments. The syntax module 308 may also interact with the grammar module 304 to describe the contents of the post or thread 302 according to the one or more rules or principles.

The lexicon module 310 with vocabulary support in the single embodiment or in some embodiments. The vocabulary support comprises a set of lexemes to support the parser 300. For example, the lexicon module 310 provides a set of expressions and/or vocabularies and their respective linguistic morphology to support the parser 300 such that the parser may understand the contents of the post.

One or more of the grammar module 304, the semantics module 305, the syntax module 308, and the lexicon module 310 interact with the language analyzer 314 to perform the grammatical analysis, the semantic analysis, the syntactical analysis, or the lexical analysis to help understand or describe the posts or threads 302 in the single embodiment or in some embodiments. The language analyzer 314 may further interact with an intelligent logic system 312 to further better help understand or describe the posts or threads 302 in the single embodiment or in some embodiments.

The intelligent logic system 312 may comprise, for example but not limited to, artificial intelligence module, an expert system, a knowledge engineering module, a fuzzy logic module, a supervised or unsupervised learning module or any other types of module with intelligence to improve the accuracy of the understanding or description of the posts or threads 302. For example, the intelligent logic system 312 may provide additional capabilities to the language analyzer 314 to resolve ambiguities by using or implementing expert assessment of the posts or threads 302 and may further invoke, for example, a decision logic of an artificial intelligence module to determine whether the accuracy of the understanding or description of the posts or threads may be improved.

In some embodiments, the method or system adopts a neural network for the purpose of artificial intelligence. In some embodiments, the neural network refers to the artificial neural network or a simulated neural network which is composed of structurally or functionally interconnecting artificial nodes or programming constructs using a mathematical and/or a computational model for information processing by mimicking one or more properties of biological neurons based upon a connectionistic approach to computation without actually constructing the actual model of the system under investigation. Note that various terms such as neurons, neurodes, processing elements, or units may be used interchangeably with the term "structurally or functionally interconnecting artificial nodes" or "programming constructs". In various embodiments, the artificial neural network comprises an adaptive system which changes its structure based upon external and/or internal information that goes through the artificial neural network.

Artificial intelligence training on the artificial intelligence system or the artificial neural network may be performed to find, fine tune, adjust, or modify one or more relationships or correlations between, for example, the available information or data and the language analyzer 314 or between the determined understanding or description and the contents of the posts or threads 302. Once the training of the artificial intelligence process or module is complete, the method or the system may then utilize the artificial intelligence module for the understanding, description, or analysis of the posts or threads.

One example of a suitable storage module 315 comprises one or more databases 316 and a data storage portion 318, which may store thereupon, for example but not limited to, user information, data, and statistics, forum information, data, and statistics, various posts and threads, etc. For example, such information, data, or statistics may comprise the time of the posts, a user's post counts, a user's level, average length of posts, average length of posts in a thread, etc. The one or more databases 316 and the data storage 318 may be implemented in separate storage units such as any volatile or non-volatile computer readable, non-transitory storage media. In some embodiments, the one or more databases 316 and the data storage 318 may be implemented in a single storage unit.

Figure 4:
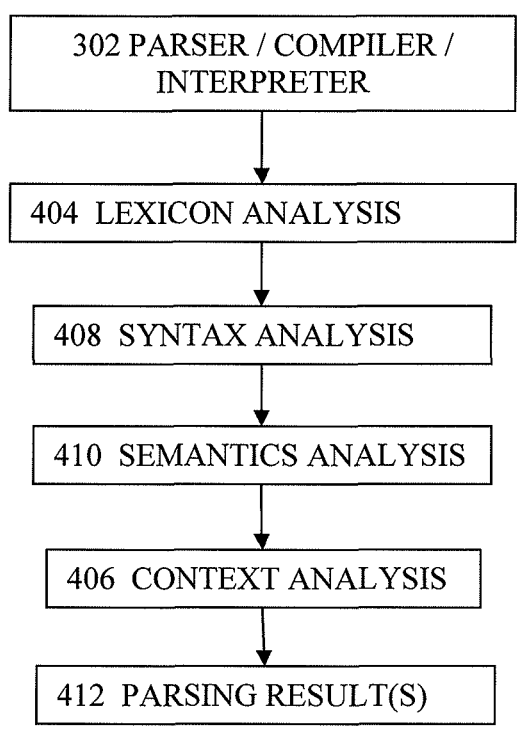
FIG. 4 illustrates more details of a parser/compiler/interpreter of a data capture module or process of a system or method for analyzing behavior of Internet forum participants.

Referring to FIG. 4, which illustrates more details of a parser/compiler/interpreter of a data capture module or process of a system or method for analyzing behavior of Internet forum participants, the parser 302 comprises the lexicon analysis process or module 404, which performs a lexing or scanning process to break up the contents of the posts or threads 302 into small tokens or units of the language. The units of language may be, for example, keywords, identifiers, or symbols such that the contents of the posts or threads may be recognized. The parser 302 may further comprise the syntax analysis process or module 408 which processes the results of the lexicon analysis process or module 404 to identify the syntactic structure of the posts or threads 302 so as to build a parsing result such as, but not limited to, a parse tree which represents the syntactic structure according to some grammar(s).

The parser 302 may further comprise the semantics analysis module or process 410 by using, for example, the language analyzer process or module 312 based at least in part on the information from one or more processes or modules 304-310 to add semantic information to the result(s) of the syntactic analysis module or process 408 in the single embodiment or in some embodiments. The semantic analysis process or module 410 may further comprise the process or module for performing static or dynamic semantic checks for type errors.

The parser process or module 302 may also comprise the context analysis process or module 406 to analyze the context in which certain tokens or units are used so as to further ascertain or correct the results of various results of the lexicon analysis process or module 404, the syntax analysis process or module 408, the semantics analysis process or module 410. For example, the context analysis process or module 406 may determine the meaning of a particular word or a particular symbol based on the preceding and/or the subsequent words, symbols, or expressions. For example, the exclamation mark ! has different meaning depending on the context in which the exclamation mark is used. In a literal construction, the exclamation mark may indicate a sharp or sudden utterance expressive of strong feeling of the user. On the other hand, the exclamation mark in a relational operator means "not equal to" when the exclamation mark is followed by "=".

At 412, the parser 302 may comprise the process or module of building the parsing result(s) in the single embodiment or in some embodiments. The parsing result may comprise, for example but not limited to, a parse tree or a linguistic parse tree which may be further used for additional processing.

Figure 5:
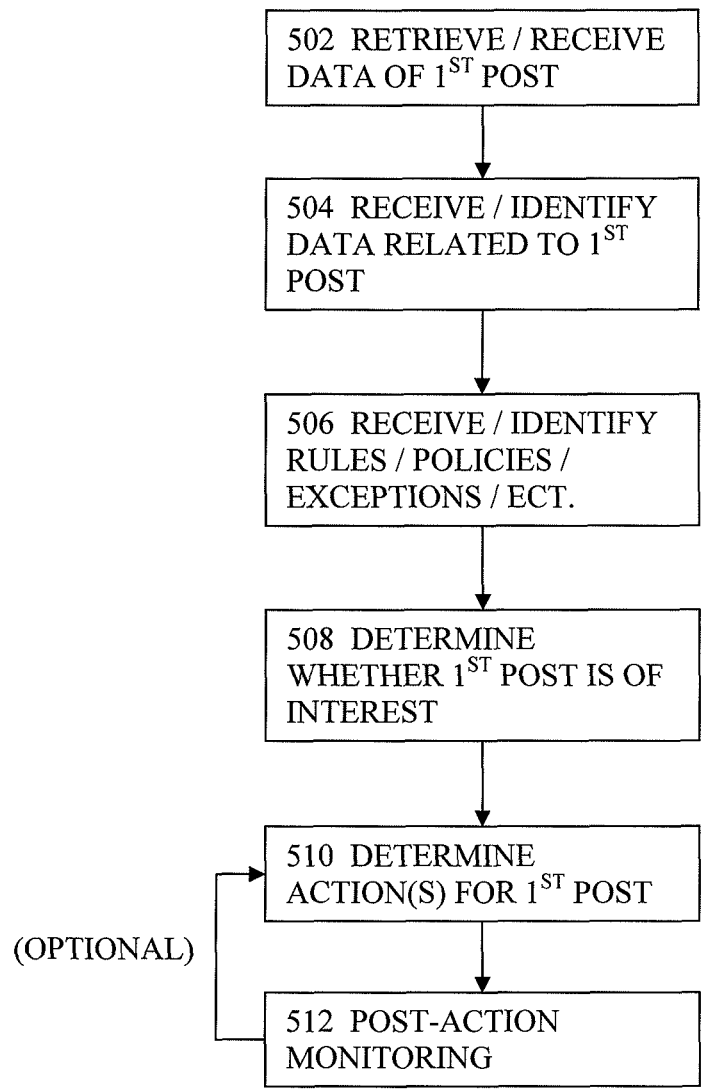
FIG. 5 illustrates more details of an analysis module or process of a method or a system for analyzing behavior of Internet forum participants.

Referring to FIG. 5 which illustrates more details of an analysis module or process of a method or a system for analyzing behavior of Internet forum participants. At 502, the analysis module or process comprises retrieving, receiving, or identifying information or data of a first post in the single embodiment or in some embodiment. The information or data may comprise, for example but not limited to, length of the post, the time of posting of the first post, the information or data concerning the user who created the first post, the number of times that the user quoted other posts or threads in the first post, the number of times that the first post is ignored by other users, or the contents, description, or understanding of the first post from the parser 302, etc.

At 504, the analysis module or process may further comprise receiving, retrieving, or identifying other information or data that are related to the first post. For example, the other information or data related to the first post may comprise, but not limited to, the number of times that the first post is quoted by other users, the number of times other users sent private messages to the user creating the first post, the average length of posts in the Internet forum, the number of users participating in the discussion related to the first post, the ratio of experienced users to new users involved in the discussions related to the first post, the identity of other users that engaged in discussions or in private discussions with the user of the first post, the identity and other related information of the users who ignored the first post, or the number of times the user of the first post ignored other posts, etc.

At 506, the analysis module or process may further comprise the process or module of determining whether the first post is of interest in the single embodiment or in some embodiments. More information about the process or module 506 will be described in further details in subsequent paragraphs with reference to other figures.

At 510, the analysis module or process may further comprise the process or module of determining the actions for the first post based on the result(s) of the process or module 508 in the single embodiment or in some embodiments. More information about the process or module 510 will be described in further details in subsequent paragraphs with reference to other figures.

At 512, the analysis module or process may further comprise the process or module of performing post-action monitoring in the single embodiment or in some embodiments. More information about the process or module 512 will be described in further details in subsequent paragraphs with reference to other figures.

Figure 6:
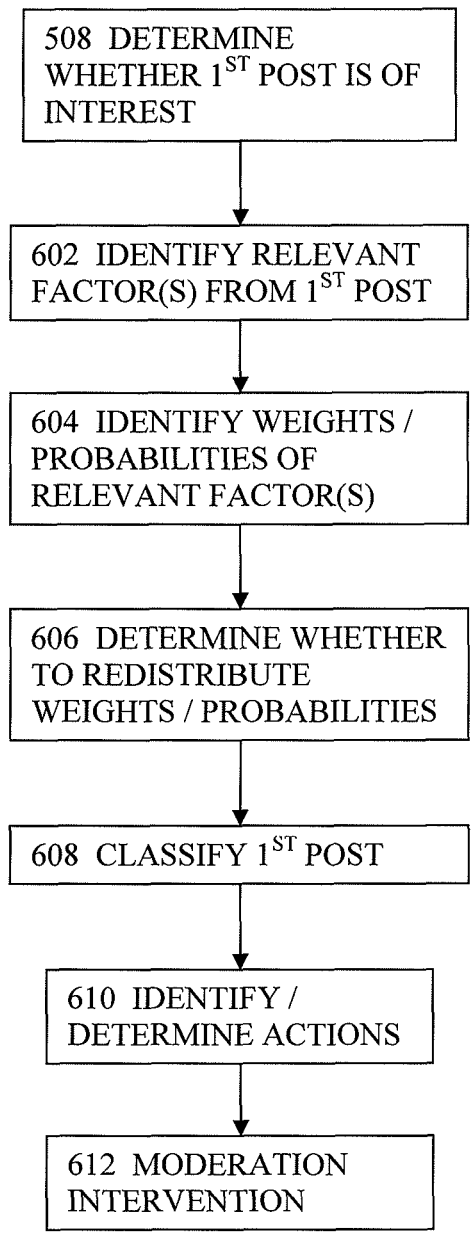
FIG. 6 illustrates more details of an analysis module of a method or a system for analyzing behavior of Internet forum participants.

Referring to FIG. 6 which illustrates more details of an analysis module of a method or a system for analyzing behavior of Internet forum participants. The process or module of determining whether the first post is of interest 508 may comprise the process or module of identifying or determining one or more relevant factors from the first post at 602 in the single embodiment or in some embodiments. In some embodiments, the identification or determination of the one or more factors may be based on the results generated by the data capture module 106, the data or information from the processes or modules of 502 or 504, or any other information or data such as statistical or historical data that may be used to distinguish the first post from other posts or to determine whether the first post rises above a general noise level so as to become "influential".

At 604, the process or module of determining whether the first post is of interest 508 may further comprise the process or module of identifying weights or probabilities of the one or more relevant factors in the single embodiment or in some embodiments. In some embodiments, for example, the process or module 604 may, based on the data or information of the first post or any other information or data from other modules or processes, to determine that the time of the first post is late at night, that the length of the first post is significantly longer than the average length of posts on the Internet forum, and that the discerned understanding or description of the contents of the first posts may suggest that there may exist some negative connotation in the first post.

In this example, the process or module may determine that the relevant factors of the first post are the length of the first post, the time of posting of the first post, and the possibly negative meaning of the first post. The process or module 604 may then determine the corresponding probability or weight for each of the three factors. In some embodiments, the process or module may determine the appropriate weight or probability of a factor by historical or statistical analysis of the historical data available for the Internet forum. For example, the statistical analysis may have determined that the probability that a post having significantly long content rises above the level of general noise or is likely to be influential is 10%, that the probability that a post having a posting time late at night rises above the level of general noise or is likely to be influential is 5%, and that the probability that a post having possibly negative connotation rises above the level of general noise or is likely to be influential is 20%.

In the single embodiment or in some embodiments, the process or module of determining whether the first post is of interest 508 may further comprise determining the mood, feeling, attitude, etc. of the user or participant of the first post and determine the corresponding action(s) accordingly. For example, various processes or modules may determine that the first post reflects the user creating the first post is not quite satisfied with certain aspects of the product and thus generate one or more actions in response so as to ameliorate such mood, feeling, attitude, etc. of the user.

At 606, the process or module of determining whether the first post is of interest 508 may further comprise the process or module of determining whether or not the probabilities or the weights should be redistributed in the single embodiment or in some embodiments. In the above example, there are only three determined factors for the first post. Nonetheless, the databases of the system may contain much more factors than just these three. Furthermore, the databases of the system may also contain information or data showing that certain factors, when present at the same time in a post, may have compounded effect due to the interrelation among the factors. The process or module of 606 may thus determine whether the weights or probabilities of the identified or determined one or more factors need to be redistributed based at least in part upon the statistical data for the Internet forum.

At 608, the process or module of determining whether the first post is of interest 508 may further comprise the process or module of classifying the first post in the single embodiment or in some embodiments. For example, the process or modules described herein takes in a post and determine an appropriate action for such a post. Nonetheless, because of ambiguities in the use of language, especially in the cases where the post does not actually rise to the level of offensive or has not been flagged or complained about, the processes or modules may determine multiple possible outcomes for a particular post. For example, the processes or methods may incorporate the use of an artificial neural network to determine possible action(s) for a particular post. In these examples, the process or module 608 is then invoked to classify the first post. In some embodiments, the process or module 608 classifies the first post to a plurality of possible classes, each of which may be associated with a probability that the first post is likely to fall with a particular class. For example, the process or module 608 may classify the first post as "spam", "double posting", "offensive", "excellent", etc.

At 610, the process or module of determining whether the first post is of interest 508 may further comprise the process or module of identifying or determining one or more actions based at least in part on the classification of the first post in the single embodiment or in some embodiments. That is, based on the classification of the first post, the process or module 610 may then identify or determine the corresponding action(s) for the first post. For example, if the first post is classified as "double posting", the corresponding action may comprise reducing the post counts of the user. If the first post is classified as "spam", the corresponding action may comprise removing the post or imposing a temporary ban on the user.

At 612, the process or module of determining whether the first post is of interest 508 may further optionally comprise the process or module of requesting intervention by the moderation team in the single embodiment or in some embodiments. In these embodiments, the process or module 610 may send a report together with its recommended action(s) and report/explanations of the recommended action(s) with related information of the first post.

Figure 7:
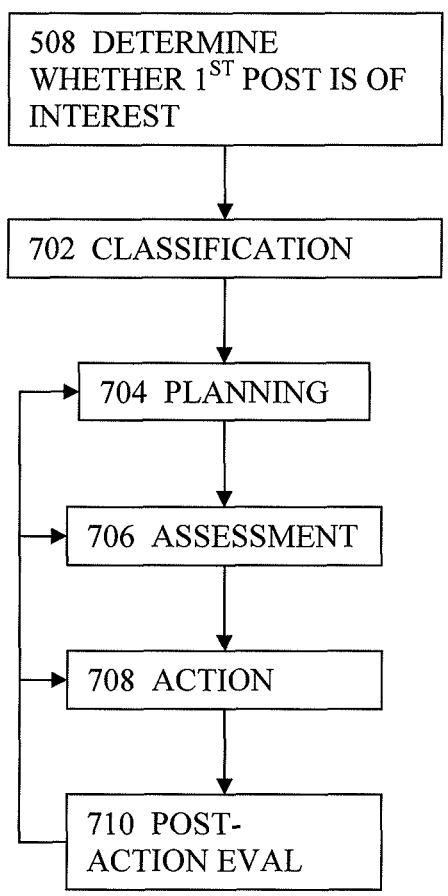
FIG. 7 illustrates more details of an analysis module of a method or a system for analyzing behavior of Internet forum participants.

Referring to FIG. 7 which illustrates more details of an analysis module of a method or a system for analyzing behavior of Internet forum participants. The process or module of determining whether the first post is of interest 508 may comprise the classification process or module 702 in the single embodiment or in some embodiments. The process or module of determining whether the first post is of interest 508 may further comprise the planning process or module 706 in the single embodiment or in some embodiments. The process or module of determining whether the first post is of interest 508 may further comprise the action process or module 708 in the single embodiment or in some embodiments. The process or module of determining whether the first post is of interest 508 may further comprise the post-action evaluation process or module 710 in the single embodiment or in some embodiments. More information about the processes or modules 702-710 will be described in further details in subsequent paragraphs with reference to various figures. It shall be noted that in some embodiments, the process or module 508 may revert back to any of 704-708 pending the evaluation results of the post-action evaluation process or module 710.

Figure 8:
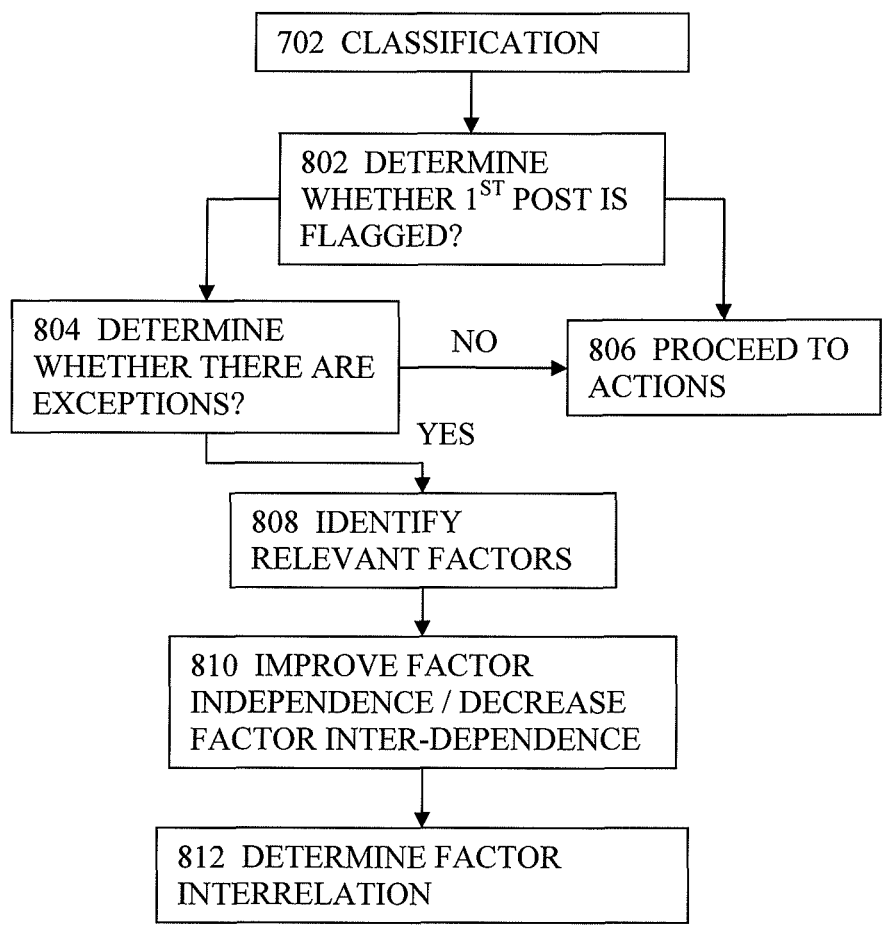
FIG. 8 illustrates more details of an analysis module of a method or a system for analyzing behavior of Internet forum participants.

Referring to FIG. 8 which illustrates more details of an analysis module of a method or a system for analyzing behavior of Internet forum participants. The classification process or module 702 may comprise the process or module of determining whether the first post is flagged or is complained about by other users at 802 in a single embodiment or in some embodiments. At 806, the process or module 702 may proceed directly to 806 to invoke the action process or module if the first post has been flagged or complained about by other users in some embodiments.

At 804, the classification process or module 702 may proceed to 804 to determine whether there exist any exceptions that may lift the first post out of the "flagged" or "complained" status when the first post is determined to have been flagged or complained about at 802. In some embodiments where the process or module 702 determines that there exists no exception that may lift the first post out of the "flagged" or "complained" status, the process or module 702 may proceed directly to invoke the action process or module at 806. Where the process or module 802 determines that the first post has not been flagged or complained about, the process or module may proceed through 804 without determining whether there exist any exceptions for the first post.

For example, if the process or module 702 finds that the first post has been flagged or complained by a user who has previously flagged or complained other posts without proper basis or reasons the process or module may lift the first post out of the "flagged" or "complained" status. As another example, if the process or module 702 determines that the first post actually does not contain any factors that may cause the first post to rise above a general noise level or to be likely to become "influential", the process or module may lift the first post out of the "flagged" or "complained" status.

At 806, the classification process or module 702 may further comprise identifying one or more relevant factors for the first post in the single embodiment or in some embodiments. At 810, the classification process or module 702 may further comprise improving independence of the one or more relevant factors or decreasing the inter-dependence among the one or more relevant factors. In some embodiments, the classification process or module 702 may comprise performing independent component analysis or blind source separation for improving independence of the one or more relevant factors or decreasing the inter-dependence among the one or more relevant factors. In some embodiments, the classification process or module 702 may comprise maximizing statistical independence of the one or more relevant factors. As explained above, there may exist certain interrelation among various factors, and the simultaneous presence of two factors in a single post may increase or decrease the likelihood that the post may become "influential". Therefore, the process or module 810 may improve the accuracy of the determination of whether the first post is likely to be "influential" by improving independence of the one or more relevant factors or decreasing the inter-dependence among the one or more relevant factors.

At 812, the classification process or module 702 may further comprise the process or module of determining the interrelation among the one or more relevant factors in the single embodiment or in some embodiments. For example, the classification process or module 702 may determine whether the presence of certain relevant factors in the first post may change the likelihood that the first post is "influential" based on the knowledge engineering system, expert system, artificial intelligence system, or the statistical or historical data of the Internet forum.

Figure 9:
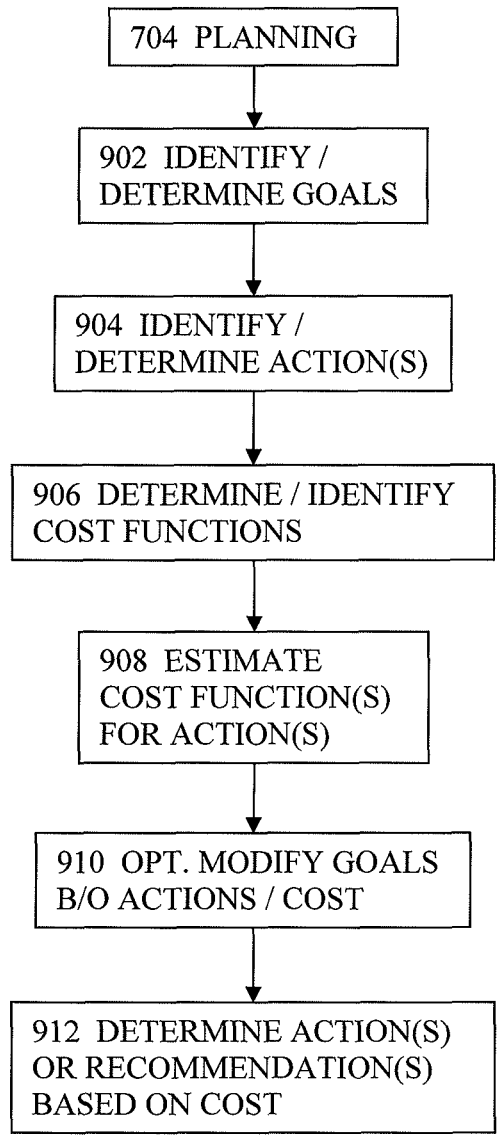
FIG. 9 illustrates more details of an analysis module of a method or a system for analyzing behavior of Internet forum participants.

Referring to FIG. 9 which illustrates more details of an analysis module of a method or a system for analyzing behavior of Internet forum participants. The planning process or module 704 may comprise the process or module of identifying or determining one or more goals 902 in the single embodiment or in some embodiments. In some embodiments, the one or more goals comprise a final goal and one or more intermediate goals. For example, the planning process or module 704 may determine the final goal to be no change in the posting behavior of the group of users involved in the discussion related to the first post by publicly admonishing the user of the first post in the forum with intermediate goals of no more than 20% decrease in the post counts from the group of users in the first two weeks and not more than 10% decrease in the post counts from the same group between two weeks and four weeks after the public admonishment.

At 904, the planning process or module 704 may comprise identifying or determining one or more actions for the first post in the single embodiment or in some embodiments. At 906, the planning process or module 704 may comprise determining or identifying one or more cost functions for the one or more actions in the single embodiment or in some embodiments. In some embodiments, the planning process or module 704 comprises determining or identifying a cost function for each of the one or more actions that are determined or identified at 902.

At 908, the planning process or module 704 may comprise estimating the one or more cost functions for the one or more actions determined or identified at 904 in the single embodiment or in some embodiments. In some embodiments, the planning process or module 704 comprises estimating the respective cost function for each of the one or more actions. At 910, the planning process or module 704 may optionally comprise the process or module of modifying at least one of the one or more goals that are identified or determined at 902 based at least in part upon the result(s) of the process or module of estimating the cost function(s) for the one or more actions at 908 in the single embodiment or in some embodiments. In some embodiments, the process or module 910 may be performed if the process or module of estimating the cost functions result in some undesirable results or some results that may be improved upon.

At 912, the planning process or module 704 may comprise the process or module of determining one or more recommended actions or one or more recommendations based at least upon the result of the process or module of 908 and further optionally based at least upon the result of optionally modifying at least one of the one or more goals of 910.

Figure 10:
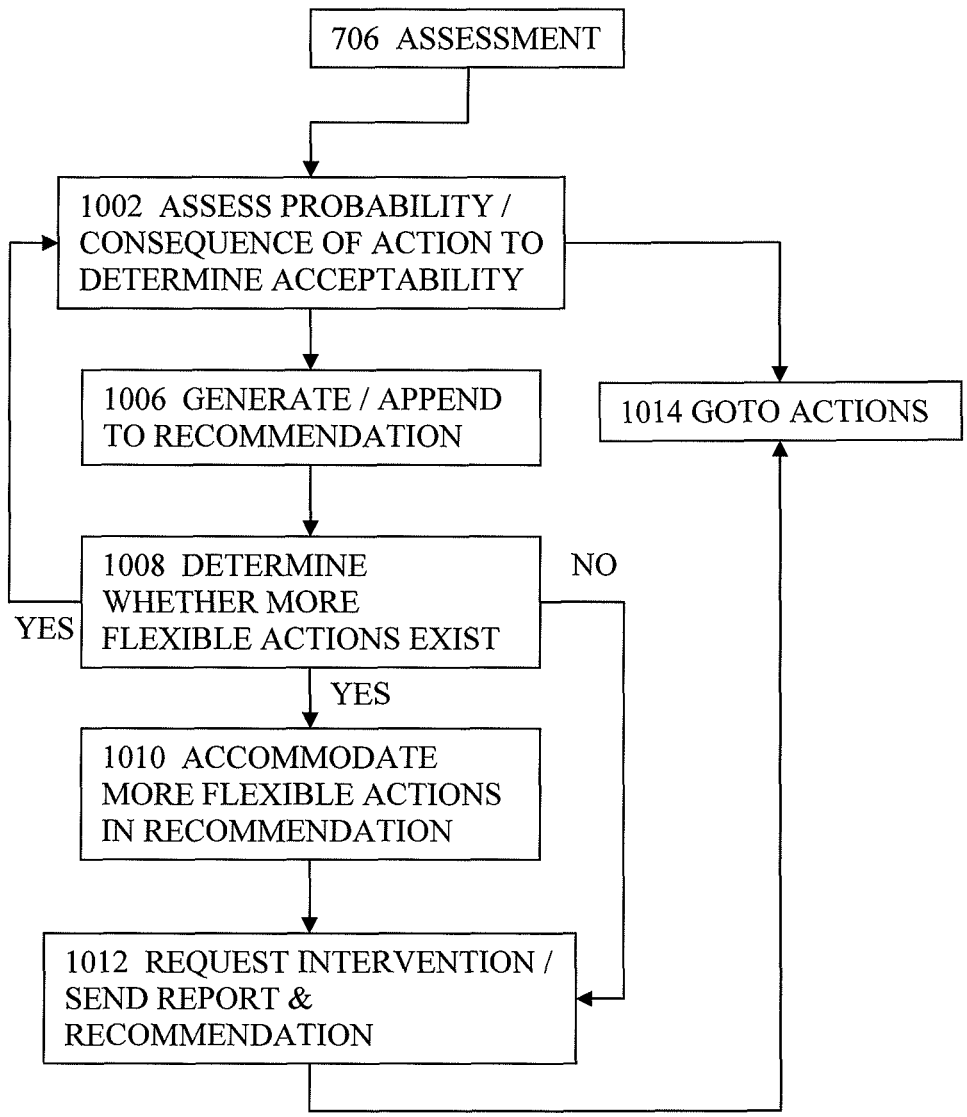
FIG. 10 illustrates more details of an analysis module of a method or a system for analyzing behavior of Internet forum participants.

Referring to FIG. 10 which illustrates more details of an analysis module of a method or a system for analyzing behavior of Internet forum participants. The assessment process or module 706 may comprise the process or module of assessing the consequence of the recommended actions or recommendations and the probability thereof to determine whether the probability or the consequence is acceptable at 1002 in the single embodiment or in some embodiments. For example, the assessment process or module 706 may determine the probability that a recommended action is correctly determined or determine the consequence of the action when the action is in fact correctly determined or the consequence of the action when the action is in fact incorrectly determined in some embodiments.

In some embodiments where the assessment process or module 706 determines that the consequence is acceptable or that the probability of the recommended action being correctly determined is high, the assessment process or module 706 may proceed to 1014 to invoke the action process or module. In some embodiments where the assessment process or module 706 determines that the consequence is probably not acceptable or that the probability of the recommended action being correctly determined is low, the assessment process or module 706 may proceed to 1006 to generate additional report(s) or recommendation(s) and append such additional report(s) or recommendation(s) to the recommendation(s) or report(s).

At 1008, the assessment process or module 706 may comprise the process or module of determining there exist more flexible actions in the single embodiment or in some embodiments. In some embodiments, the assessment process or module 706 may then determine anew the more flexible actions or may identify the previously identified but non-selected actions and analyze the acceptability of these more flexible actions. That is, the assessment process or module 706 may further revert back to 1002 to re-assess the probability or consequence of these more flexible actions to determine their acceptability in these embodiments.

At 1010, the assessment process or module 706 may comprise the process or module of accommodating the more flexible action(s) in the recommendation(s) or the recommended action(s) in the single embodiment or in some embodiments. In some embodiments, the assessment process or module 706 may comprise the process or module of providing more detailed information or data in the recommendation(s) or the recommended action(s).

At 1012, the assessment process or module 706 may comprise the process or module of requesting intervention or sending report(s) to the moderation team in the single embodiment or in some embodiments. In some embodiments where the assessment process or module 706 determines that no more flexible actions exist, the assessment process or module 706 may proceed directly from 1008 to 1012. After the process or module 706 requests intervention or sends report(s) or recommendation(s), the assessment process or module 706 may optionally proceed to 1014 to invoke the action process or module.

In some embodiments, either the planning process or module 704 or the assessment process or action may determine or identify an order or one or more priorities for the recommendations and the recommended one or more actions based at least in part on one or more criteria before sending such recommendations or recommended actions to the moderation team. For example, various processes or modules may send the recommendation or recommended actions for posts that may cause negative effects to the Internet forum to the moderation team for review before sending the recommendation or recommended actions for posts that may cause positive effects to the Internet forum. The processes or modules may also include the recommendation and recommended actions for posts with both types of possible influence for review by the moderation team at the same time but indicate the recommendation or recommended action with different importance, priority, or order. In some embodiments, various processes or modules may further determine the order of or rank or prioritize the recommendation or recommended actions based at least in part on, for example but not limited to, respective estimated cost of each of the recommendation or recommended actions or on the respective likelihood that the posts under consideration may become influential. In these embodiments, the moderation team need not sift through the entire records of the Internet forum and need not worry about which records are to be reviewed first while hoping that the moderation team does not inadvertently miss more important or more critical records.

Referring to FIG. 11 which illustrates more details of an action module of a method or a system for analyzing behavior of Internet forum participants. The actions may comprise, for example but not limited to, sending a message to the user of the first post via a private messaging or a public post in the Internet forum (1102). The actions may also comprise exiling or banning the user of the first post (1104). The exile or banning may be for a temporary period of time with prolonged period of exiling or banning for repeated violations or offenses. For example, the action may be a two week ban or exile imposed on the user's account during which the user of the first post cannot post or even access the Internet forum.

The exile or bank may also be a permanent exile or ban on the user account of the first post. In the event that the original user of the first post creates another account after the original account was permanently banned, the action may comprise an IP ban or an IP range ban.

The action may also comprise removing the contents of the first post in whole or in part (1106) in the first post and in one or more threads (1106) in which the first post was quoted. The action may also comprise a temporary or a permanent lock on the topic or thread (1108) such that no further posting may be allowed. The actions may also comprise a temporary or permanent on the thread including the first post (1110) such that no further posting is allowed. The actions may further comprise word censor (1112) where the inappropriate part(s) of the first post will be removed.

The actions may also comprise adjusting the post counts of the user of the first post (1114) or adjusting the status of the user of the first post (1114). The action of adjusting the post counts may be appropriate when the user of the first post is in fact committing double posting. The action of adjusting the status of the user by, for example, lowering or promoting the ranking or level of the user of the first count may be appropriate to reduce or increase the influence of the user based on the first post.

The actions may also comprise awarding the user of the first count for his or her contribution in the first post (1116). The actions may further comprise offering discount for future purchases of products or services to appreciate his or her contribution (1118). This may be done either privately via private messaging or publicly via a public announcement or post in the Internet forum. The actions may also comprise the automatic generation of post(s) or announcement(s) with needed information where the discussion involving the first post does not appears to lead to satisfactory answers.

Referring to FIG. 12 which illustrates criteria or factors that may be considered by a method or a system (1202) for analyzing behavior of Internet forum participants. For example, the processes or modules may determine whether the first post is likely to be of interest by considering the number of threads started by a particular user (1202). The processes or modules may also consider the number of posts created by a particular user (1204) and/or the quality of the posts by the user in the single embodiment or in some embodiments. For example, various processes or modules may associate higher probability or heavier weight to a post of a user who is determined to have frequently created good quality posts.

The processes or modules may also consider the length of the discussion involving the particular post under analysis (1206) in the single embodiment or in some embodiments. For example, various processes or modules may determine that a longer post may contain more information and thus is more likely to be "influential" and therefore deserves higher probability or heavier weight. The processes or modules may also consider the number of users participating in the discussions involving the particular post (1208) in the single embodiment or in some embodiments. For example, various processes or modules may determine that a post involving more users is likely to be more influential and thus may be assigned a higher probability or a heavier weight.

The processes or modules may also consider the ratio of experienced, advanced, or higher level users to novice or lower level users in the discussions of a particular post (1210) in the single embodiment or in some embodiments. For example, the any discussions involving a particular post among more experienced or higher level users may indicate better quality of the discussion or a more complicated issues with the products or services to which the Internet forum is dedicated, and thus the user that initiated such discussions may thus be awarded more dearly. The processes or modules may also consider the more frequently searched terms (1212) and award the users that provide satisfactory answers to the questions involving such terms in the single embodiment or in some embodiments. The processes or modules may also consider the time of day during which a particular post was created (1214) in the single embodiment or in some embodiments. For example, a post created late at night or some irregular hours may indicate that the user creating the post may be extremely bothered by such problems relating to the post so as to stay up to create such a post.

The processes or modules may also consider the amount of contents within the context of particular issues in a particular post (1216) in the single embodiment or in some embodiments. For example, posts with more contents may indicate that the user either raises more complex issues or more detailed description of the issues or provides more information to answer certain questions, and such post thus demands more attention. The processes or modules may also consider the length of the chains of quotes of a particular post (1218) in the single embodiment or in some embodiments. For example, if a particular post is quoted in a longer chain of quotes, the processes or modules of various embodiments of the invention may determine that the quoted post may be of particular interest to draw more attention or may be particularly bothersome to a larger group of users.

The processes or modules may also consider which users are involved in the discussion of a particular post (1220) in the single embodiment or in some embodiments. For example, the experience level of the users involved in a particular discussion involving a particular post may indicate the technical sophistication of the user initiating the particular post. As another example, regular involvement of certain users in some offensive posts may indicate the likelihood that posts created by these users are offensive may be higher than posts created by other users who have demonstrated better credentials. Also, a posts that induces criticism by users with better credentials may indicate that these posts may be more likely to be problematic.

The processes or modules may also consider the number of times or percentage of times the user creating the particular post under consideration quotes other posts (1222) and the context within which those other posts were quoted by the user in the single embodiment or in some embodiments. For example, if a user of a particular post frequently quotes other posts so as to subject such other posts to ridicule or mockery, the more quotes by such a user does not indicate the active participation of such a user yet may further indicate that the user may be more likely to incite negative effects among other users. The processes or modules may also consider how of the user of a particular post under consideration is quoted by others and the context within which the user was quoted by other users (1224) in the single embodiment or in some embodiments. For example, if a particular user of a particular post under consideration is often quoted by users with good credentials, the particular post under consideration may also require more attention and thus may be associated with a higher probability or heavier weight when determining whether the particular post is likely to be influential.

The processes or modules may also consider the number of times or percentage of times a particular user is quoted within a particular thread including the particular post under consideration (1226) in the single embodiment or in some embodiments. The processes or modules may also consider the number of times or percentage of times that the "quote" button (or any other buttons for users to provide quick feedback) is clicked on in a particular post (1228) in an Internet forum which provides such a "quote" button in the single embodiment or in some embodiments. The more times or higher percentage of times the button is clicked on for a particular post may indicate the popularity or notoriety of such a post which is thus more likely to be "influential".

The processes or modules may also consider the number of times or percentage of times that a user of a particular post under consideration checks other users' profiles (1230) in the single embodiment or in some embodiments. The processes or modules may also consider the number of times or the percentage of times that a user's profile is checked by other users (1232) in the single embodiment or in some embodiments. The processes or modules may also consider the number of times or percentage of times that a user leaves comments on other users' profiles, the context of comments, and the identity of such other users (1234) in the single embodiment or in some embodiments. For example, if a user leaves comments on a group of certain users, and such comments are more likely to be negative, the discussions involving the user and those certain users regarding a particular post may be associated with a higher likelihood of being problematic.

The processes or modules may also consider whether a user of a particular post has sent other users private messages, and the number of times that the user has done so (1236) in the single embodiment or in some embodiments. The process or modules may further consider the content of such private messages and the context within which such private messages are sent. For example, if a user usually sends private messages to other users to remind such other users of their lack of netiquette, the user may be considered less likely to cause problems or issues in the Internet forum. If a user usually responds to popular questions by opting for private messaging rather than via the public forum the processes or modules may, for example, sends messages to the user to encourage the user to share his or her knowledge with other users. In some embodiments, the processes or modules may first analyze the correctness or accuracy of the contents of such private messages The processes or modules may also consider whether and how frequently the user of the particular post under consideration has ignored other users' posts (1238) in the single embodiment or in some embodiments. The processes or modules may also consider whether and how frequently other users have ignored the user of the particular post under consideration (1240) in the single embodiment or in some embodiments. In the single embodiment or in some embodiments, one or more of the above criteria or factors may be considered by various processes or modules such as, but not limited to, the process or module 508 of determining whether the first post is of interest.

In accordance with the description in various paragraphs or figures as disclosed herein, some embodiments are directed at a hardware computing system which comprises at least one processor and is communicatively coupled with respective computers of a plurality of participants of an Internet forum through respective networks, where one or more participants of the Internet forum create and post respective online messages or posts to the hardware computing system for viewing by other participants of the Internet forum. The hardware computing system may further comprise or may be further programmed or configured to become operatively coupled with or to work in conjunction with a data capture module for generating or identifying data associated with an online message created by a participant of the Internet forum and posted to the hardware computing system. Moreover, the hardware computing system may further comprise or may be further programmed or configured to become operatively coupled with or to work in conjunction with a online behavior module which is also executing on the hardware computing system for analyzing the generated or identified data relative to one or more predetermined online behavior criteria to determine an online behavior of a participant to report the online behavior to a moderator of the Internet forum.

In accordance with the description in various paragraphs or figures as disclosed herein, some embodiments are directed at an article of manufacture which comprises a non-transitory computer readable medium storing thereupon a series of instructions which, when executed by a computer system, causes the computer system to perform a process for analyzing an online behavior of a participant of an internet forum. In some embodiments, the process for analyzing the online behavior includes the action of identifying or generating data associated with an online message or a post, which was created and posted by a participant of the Internet forum for viewing by other participants of the Internet forum. In some embodiments, the process for analyzing an online behavior may further comprise the action of analyzing the generated or identified data relative to one or more predetermined online behavior criteria and the action of reporting the analysis results or the determined online behavior to a moderator of the Internet forum.

In accordance with the description in various paragraphs or figures as disclosed herein, some embodiments are directed at a hardware computing system which comprises at least one processor and may comprise or may be programmed or configured to become operatively coupled with or to work in conjunction with a data capture module, which is executing on the hardware computing system, for receiving or retrieving data related to a post or an online message that is created by a user or a participant of an Internet forum. Moreover, the hardware computing system may further comprise or may be further programmed or configured to become operatively coupled with or to work in conjunction with an online behavior analysis module which is also executing on the hardware computing system for analyzing the data retrieved or received at the data capture module to determine the behavior of a user. In addition, the hardware computing system may also comprise or may be further programmed or configured to become operatively coupled with or to work in conjunction with a reporting module that is also executing on the hardware computing system for reporting the analysis result or the determined behavior of the user to a moderator of the Internet forum.

In accordance with the description in various paragraphs or figures as disclosed herein, some embodiments are directed at an article of manufacture which comprises a non-transitory computer readable medium storing thereupon a series of instructions which, when executed by a computer system, causes the computer system to perform a process for analyzing an online user behavior of an internet forum. In some embodiments, the process for analyzing the online user behavior includes the action of receiving or retrieving data related to a post or an online message that is created and posted by the user for viewing by other user(s) of the Internet forum in accordance with the description in various paragraphs or figures as disclosed herein. In some embodiments, the process for analyzing the online user behavior may further include the action of analyzing the data retrieved or received at the data capture module to determine behavior of the user. In some embodiments, the process for analyzing the online user behavior may further include the action of reporting the analysis result or the determined behavior of the user to a moderator of the Internet forum.

Various embodiments as described herein may be utilized to monitor or analyze posts on various Internet forum participants including Internet forums for professional and consumer tax and accounting matters and programs such as QuickBooks® and tax preparation programs such as TurboTax®, ProSeries® and Lacerte® tax programs, which are known consumer and professional tax programs available from Intuit Inc., Mountain View, Calif., H&R Block TaxCut software, available from H&R Block, Inc., Kansas City, Mo., and TaxACT® software available from $2^{nd}$ Story Software, Inc., and GoSystem Tax RS, available from CS ThomsonReuters. TurboTax® ProSeries® and Lacerte® are registered trademarks of Intuit Inc., and TaxACT® is a registered trademark of $2^{nd}$ Story Software, Inc. QuickBooks®, Lacerte®, ProSeries® and TurboTax® are registered trademarks of Intuit Inc.

System Architecture Overview

Figure 13:
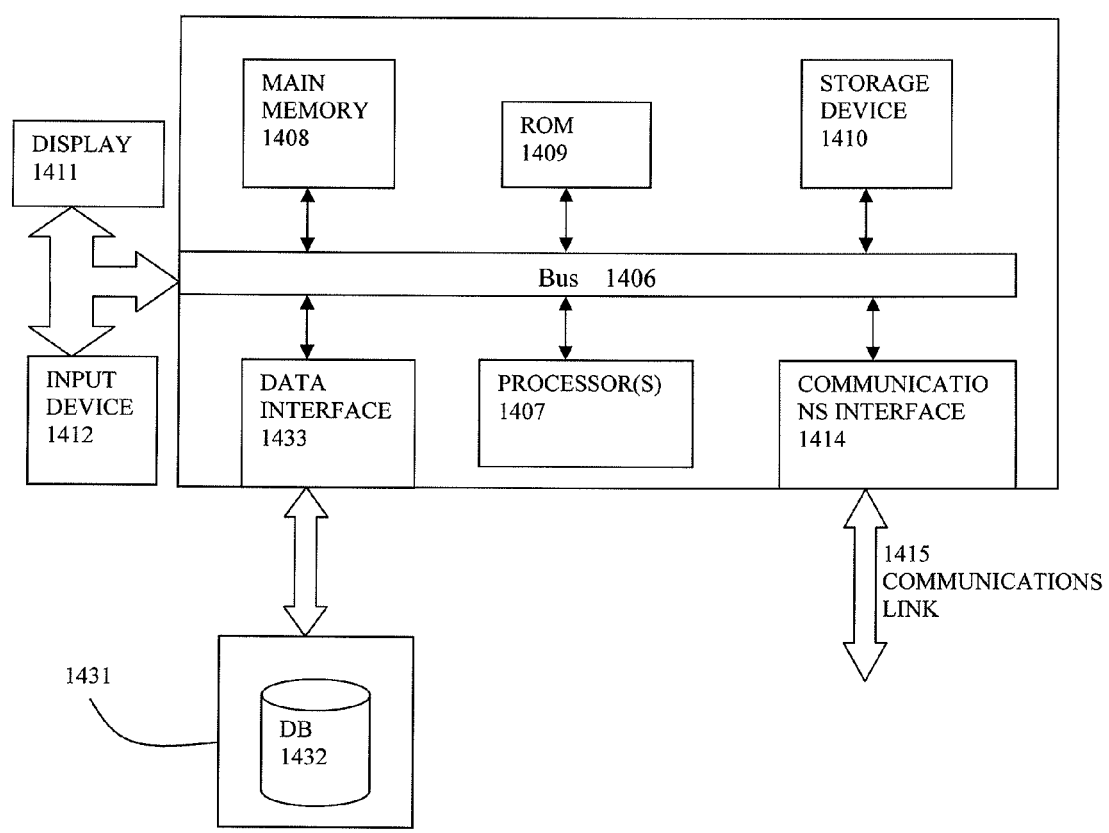
FIG. 13 illustrates a block diagram of an illustrative computing system 1400 suitable for implementing various embodiment of the invention

FIG. 13 illustrates a block diagram of an illustrative computing system 1400 suitable for implementing various embodiment of the invention. For example, the exemplary computing system 1400 may be used to implement various processes as described in the preceding paragraphs and the figures such as various processes or modules of determining whether the first post is of interest, various analysis processes or modules, various other determining processes or modules, various processes or modules for performing various actions, etc. as described in the remainder of the Application. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control (not shown).

According to one embodiment of the invention, computer system 1400 performs specific operations by one or more processors or processor cores 1407 executing one or more sequences of one or more instructions contained in system memory 1408. Such instructions may be read into system memory 1408 from another computer readable/usable storage medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention. In the single embodiment or in some embodiments, the one or more processors or processor cores 1407 may be used to perform various actions such as various actions, processes, or modules involving determining, analyzing, performing actions, etc. In some embodiments, at least one of the one or more processors or processor cores 1407 has the multithreading capability.

In one embodiment, the term "logic" shall mean any combination of software or hardware that is used to implement all or part of the invention. In the single embodiment or in some embodiments, the one or more processors or processor cores 1407 may be used to perform various acts such as various acts involving determining, analyzing, performing actions, etc. In some embodiments, at least one of the one or more processors or processor cores 1407 has the multithreading capability to execute a plurality of threads to perform various tasks as described in the preceding sections.

Various actions as described in the preceding paragraphs may be performed by using one or more processors, one or more processor cores, or combination thereof 1407. For example, various processes or modules involving the determining action, various analysis processes or modules, etc. may be performed by one or more processors, one or more processor cores, or combination thereof.

The term "computer readable storage medium" or "computer usable storage medium" as used herein refers to any non-transitory medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable storage media includes, for example, electromechanical disk drives (such as a floppy disk, a flexible disk, or a hard disk), a flash-based, RAM-based (such as SRAM, DRAM, SDRAM, DDR, MRAM, etc.), or any other solid-state drives (SSD), a magnetic tape, any other magnetic or a magneto-optical medium, CD-ROM, any other optical medium, punch cards, paper tape, any other physical medium with patterns of holes, RAM, PROM, EPROM, FLASH-EPROM, any other memory chip or cartridge, or any other medium from which a computer can read. For example, the various forms of computer readable storage media may be used by the methods or the systems to store either temporarily or permanently information or data such as the one or more master regions, one or more master output layers, one or more global scratch layers, various transforms and inverse transforms, shapes, etc.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution. In an embodiment, the computer system 1400 operates in conjunction with a data storage system 1431, e.g., a data storage system 1431 that contains a database 1432 that is readily accessible by the computer system 1400. The computer system 1400 communicates with the data storage system 1431 through a data interface 1433. A data interface 1433, which is coupled to the bus 1406, transmits and receives electrical, electromagnetic or optical signals that include data streams representing various types of signal information, e.g., instructions, messages and data. In embodiments of the invention, the functions of the data interface 1433 may be performed by the communication interface 1414.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A computer implemented method for analyzing on-line behavior patterns within an Internet forum in which a plurality of users using respective computers post respective on-line messages to a host computer such that all participants can view the on-line messages posted to the host computer, the method comprising:

the host computer executing a data capture module identifying or generating data associated with an on-line message, the on-line message being created by a participant of the Internet forum and posted to the host computer;

the host computer executing an on-line behavior module to parse the data to generate parsed data and analyze the parsed data based at least in part upon a lexicon or a syntax associated with the data relative to at least some pre-determined on-line behavior criteria;

the host computer designating the on-line message as a helpful message of interest positively contributing to the Internet forum to address an issue related to a product or service of developers of the host computer and discussed on the Internet forum based at least in part upon a result of analyzing the parsed data;

the host computer generating one or more recommended actions in response to the helpful message of interest with an analysis module executing on the host computer based at least in part upon execution results of the on-line behavior module;

the host computer reporting a result generated by the behavior module or the analysis module to a human moderator of the Internet forum for the human moderator to determine a final action from the one or more recommended actions to award the participant of the on-line message; and the host computer delivering a public announcement or message to the Internet forum for the final action that awards the participant of the on-line message to encourage the participant for positive contribution to the Internet forum.

2. The computer implemented method of claim 1, further comprising automatically performing an action related to the participant whose on-line behavior was analyzed.

3. The computer implemented method of claim 1, further comprising storing data relating to the on-line behavior of the user in a non-transitory computer readable storage media or device for review by the moderator.

4. The computer implemented method of claim 1, wherein the final action to award the participant includes offering a discount for the product or the service to the participant of the on-line message.

5. The computer implemented method of claim 4, wherein a value of an award to the participant of the on-line message increases with a higher frequency of appearance the issue.

6. The computer implemented method of claim 4, further comprising the host computer sending a private message to the participant of the on-line message.

7. The computer implemented method of claim 4, further comprising automatically generating and delivering one or more messages having needed information to the Internet forum in response to a plurality of responses to a first on-line message that lead to a satisfactory answer.

8. The computer implemented method of claim 1, wherein the host computer generates the one or more recommended actions based further at least in part upon a level of experience of the participant or a complexity of the issue to which the on-line message is directed.

9. The computer implemented method of claim 8, the one or more attributes comprising a length of the electronic message, a time when the electronic message was posted, a number of participants participating in a discussion of the on-line message, a ratio of experienced users to new participants involved in a discussion of the on-line message, a length of a chain of quotes in the on-line message, a number of times the on-line message was quoted by other participants, a number of times the on-line message quotes another participant or another on-line message, a number of times the on-line message is ignored by another participant.

10. The computer implemented method of claim 1, the on-line behavior criteria comprising one or more attributes of the electronic message.

11. The computer implemented method of claim 1, the on-line behavior criteria comprising one or more attributes of the participant whose on-line behavior is analyzed.

12. The computer implemented method of claim 1, the on-line behavior criteria comprising one or more of a length of the electronic message, a time when the electronic message was posted, a number of participants participating in discussion, a ratio of experienced users to new users, a length of a chain of quotes, one or more participants involved in the on-line message, a number of times the participant was quoted by other participants, a number of times the participant checks other participant's profile, a number of times the participant's profile is checked by other participants, a number of private messages sent by the participant to other participants, a number of private messages sent by another participant to the participant, a number of times the participant is ignored by another participant, and a number of times the participant has ignored another participant.

13. The computer implemented method of claim 1, the on-line behavior criteria comprising how another participant reacts to the on-line message posted by the participant being analyzed.

14. The computer implemented method of claim 1, the Internet forum comprising participants discussing tax matters or tax preparation programs.

15. The computer implemented method of claim 1, the Internet forum comprising participants discussing accounting matters for accounting programs.

16. The method of claim 1, the data capture generating respective data of all of the participants of the Internet forum, and the on-line behavior module analyzing all the generated data relative to on-line behavior criteria to determine respective on-line behaviors of all of the participants.

17. A computer implemented method for determining user behavior patterns, comprising:
a computer executing a data capture module to receive or retrieve data related to a post which is created by a user;
the computer executing an online behavior analysis module to parse the data related to the post to generate parsed data and to analyze the parsed data to determine behavior of the user based at least in part upon a lexicon or a syntax associated with the data;
the computer designating the post as a helpful message of interest positively contributing to the Internet forum to address an issue related to a product or service of developers of the host computer and discussed on the Internet forum based at least in part upon results of parsing the data and analyzing the parsed data;
the computer generating one or more recommended actions in response to the helpful post of interest with an analysis module executing on the host computer based at least in part upon execution results of the on-line behavior module;
the computer reporting a result generated by the act of analyzing the data to a human moderator of the Internet forum for the human moderator to determine a final action from the one or more recommended actions to award the participant of the on-line message; and
the computer delivering a public announcement or message to the Internet forum for the final action that awards the participant of the post to encourage the participant for positive contribution to the Internet forum.

18. The computer implemented method of claim 17, further comprising performing an action for the behavior of the user.

19. The computer implemented method of claim 18, further comprising:
determining or identifying one or more goals for the Internet forum; and
performing a post action.

20. The computer implemented method of claim 19, wherein the act of performing the post action comprises:
determining at least one of the one or more goals is met; and
adjusting the at least one of the one or more goals, the action for the behavior of the user based at least in part upon a result of the act of determining the at least one of the one or more goals is met.

21. The computer implemented method of claim 17, wherein the act of receiving or retrieving the data related to the post comprises:
parsing the post to generate a parsing result;
performing an analysis on the parsing result to generate an parsing analysis result; and
storing the parsing analysis result in a non-transitory computer readable storage medium or device.

22. The computer implemented method of claim 21, wherein the act of parsing the post comprises:
performing one or more linguistic analyses on the post to generate one or more intermediate parsing result; and
performing a context analysis on at least the intermediate parsing result to generate the parsing result.

23. The computer implemented method of claim 22, wherein the one or more linguistic analyses comprise one or more of a lexicon analysis, a syntax analysis, and a semantics analysis.

24. The computer implemented method of claim 17, wherein the act of analyzing the data to determine the behavior of the user comprises:
performing a classification action;
performing a planning action; and
performing an assessment action.

25. The computer implemented method of claim 24, wherein the act of performing a classification action comprises:
identifying one or more factors which are used to determine whether the post is of interest;
improving dependency among the one or more factors; and
determining an interrelation exists among the one or more factors.

26. The computer implemented method of claim 24, wherein the act of performing the planning action comprises:
determining or identifying one or more goals for the Internet forum;
identifying or determining one or more candidate actions;
identifying or determining one or more cost functions for the one or more candidate actions; and determining one or more actions based at least in part on an analysis of the one or more cost functions.

27. The computer implemented method of claim 24, wherein the act of performing the assessment action comprises:
   determining acceptability of one or more actions for the behavior of the user;
   determining whether a more flexible action exists; and
   determining whether to recommend the one or more actions or the more flexible action based at least in part upon the acceptability.

\* \* \* \* \*